United States Patent [19]

Eichenauer et al.

[11] Patent Number: 4,965,300

[45] Date of Patent: Oct. 23, 1990

[54] SEQUENTIAL COPOLYMERS BASED ON CYCLIC CARBONATES AND ESTERS

[75] Inventors: Herbert Eichenauer; Edgar Leitz, both of Dormagen; Karl-Heinz Ott, Leverkusen, all of Fed. Rep. of Germany

[73] Assignee: Bayer Aktiengesellschaft, Leverkusen, Fed. Rep. of Germany

[21] Appl. No.: 443,041

[22] Filed: Nov. 27, 1989

Related U.S. Application Data

[63] Continuation of Ser. No. 139,276, Dec. 29, 1987, abandoned.

[30] Foreign Application Priority Data

Jan. 6, 1987 [DE] Fed. Rep. of Germany ....... 3700193

[51] Int. Cl.$^5$ .............................................. C08G 63/64
[52] U.S. Cl. .................................. 525/415; 528/354; 528/358
[58] Field of Search ................. 528/354, 358; 525/415

[56] References Cited

U.S. PATENT DOCUMENTS

| | | | |
|---|---|---|---|
| 3,021,309 | 2/1962 | Cox et al. ............................ | 528/358 |
| 3,301,824 | 1/1967 | Hostettler et al. .............. | 528/357 X |
| 3,301,825 | 1/1967 | Hostettler et al. .................. | 528/354 |
| 3,324,070 | 6/1967 | Hostettler et al. ............. | 528/357 X |
| 3,379,693 | 2/1972 | Hostettler et al. . | |
| 3,639,503 | 3/1972 | Matzner . | |
| 3,641,200 | 5/1972 | Matzner . | |
| 3,682,865 | 8/1972 | Jenkins et al. .................. | 528/358 X |
| 3,795,701 | 3/1974 | Jenkins et al. .................. | 528/354 X |
| 4,503,216 | 3/1985 | Fagerburg et al. ............. | 528/354 X |
| 4,605,724 | 8/1986 | Ambrose et al. ............... | 528/354 X |
| 4,699,974 | 10/1987 | Evans ................................... | 528/354 |

FOREIGN PATENT DOCUMENTS 0255941 of 1988 European Pat. Off. .
2235965 of 1975 France .

OTHER PUBLICATIONS

Die Makromolekulare Chemie, 187; 12 (1986); 2833-2839, Basel, CH; H Keul et al.: "Block Polymers Obtained by Means of Anionic Polymerization".

Primary Examiner—Earl Nielsen
Attorney, Agent, or Firm—Connolly and Hutz

[57] ABSTRACT

Polymers having a sequential structure of the following formula $$\text{-}[\text{A}-\text{X}-\text{B}]_r\text{-} \qquad (I)$$

with r=1 to 20, in which —A— is a polymer of a cyclic carbonate, —B— is a polymer of a lactone and —X— is a link, with a decreasing concentration of residues of the cyclic carbonate in the —B— direction and a decreasing concentration of residues of the lactone in the —A— direction, and the use of the these products as molding compositions.

15 Claims, No Drawings

SEQUENTIAL COPOLYMERS BASED ON CYCLIC CARBONATES AND ESTERS

This application is a continuation, of application Ser. No. 139,276, filed Dec. 29, 1987, now abandoned.

This invention relates to sequential copolymers containing sequences of cyclic carbonates or esters and to a process for their production.

Polymers having a sequential structure, for example block copolymers, can have interesting technological properties. For example, they show properties of elastic thermoplasts or thermoplastic elastomers, depending on their structure, synthesis and chemical composition.

Such polymers are only of importance where they are readily processible, for example at normal temperatures, by standard techniques, such as injection molding, extrusion or calendering. In many cases, the stability of a polymer is determined not only by its basic chemical structure, but also—and unforeseeably—by other factors, such as the number of chemical and structural faults, structural elements which increase the stability of the polymer, terminal groups, molecular weight distribution and chemical non-uniformity.

Special sequential copolymers based on cyclic carbonates or esters have now been found, of which the properties may be adjusted within wide limits by a special process.

The present invention relates to sequential polymers having the following idealized formula:

with r=1 to 20, more especially 1 to 10, in which -A- is a polymer of a cyclic carbonate corresponding to general formulae (II) and/or (III) below ("block A")

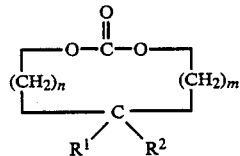

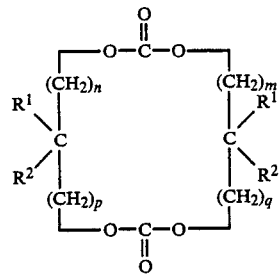

-B- is a polymer of a lactone corresponding to general formula (IV) below ("block B")

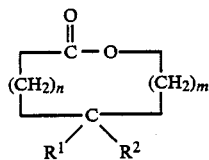

X is a central link, containing both the cyclic carbonate corresponding to formula (II) and/or (III) and also the lactone corresponding to formula (IV) in polymerized form, the concentration of the residues of (II) and/or (III) decreasing continuously in the direction of -B- and the concentration of residues (IV) decreasing continuously in the direction of -A- ("tapered structure"). In formulae (II), (III) and (IV), m, n, p and q independently of one another have the values 0, 1, 2, 3, 4, 5 or 6, with the proviso that the sum of n+m in (II) is at least 1, the sum of n+m in (IV) is at least 1 and the sums of n+p and m+q in (III) are at least 1, and $R^1$ and $R^2$ represent H, $C_1$-$C_6$ alkyl, $C_3$-$C_6$ alkenyl, $C_1$-$C_6$ alk(en)yloxy-$C_1$-$C_6$-alkyl, more especially H, $CH_3$ and $C_2H_5$.

The average molecular weights of the blocks A and B are greater than 500 to 1,000,000, preferably from 1000 to 500,000 and more preferably from 2000 to 250,000. The average molecular weights of the central links X are from 300 to 10,000 and preferably from 500 to 8000.

Particularly preferred cyclic carbonates (II) and (III) are trimethyl glycol carbonate, neopentyl glycol carbonate, 1,4-butanediol carbonate and also dimeric carbonates of pentanediol or hexanediol.

The preferred lactone (IV) is ε-caprolactone and/or pivalolactone.

The average molecular weights of the blocks A and B and of the central links X in the polymers according to the invention may be different or substantially the same.

The polymers contain the blocks A and B in quantities of from 5 to 95% by weight (based on the total quantity of A+B), but preferably in quantities of from 5 to 80% by weight A and from 95 to 20% by weight B (based on A+B) and from 5 to 80% by weight B and from 95 to 20% by weight A (based on A+B); the content of central links X with the "tapered structure" is from 5 to 50% by weight (based on A+B+X) and preferably from 5 to 25% by weight (based on A+B+X).

The present invention also relates to a process for the production of the polymers.

In this process, a solution of a mixture of cyclic carbonates (II) and/or (III) and lactone (IV) in an aromatic solvent or a ether is added in portions (number of portions=r) to a solution of an alkyl alkali metal or aryl alkali metal compound as initiator, the combined solutions are polymerized at +20° C. to −78° C. and preferably at +10° C. to −30° C. and the polymer subsequently isolated.

After polymerization, the reaction product may advantageously be neutralized or the anionic polymer formed reacted with an alkyl halide, carboxylic acid chloride, carboxylic acid anhydride or carboxylic acid ester.

Suitable aromatic solvents are benzene, toluene; a suitable ether is tetrahydrofuran; mixtures of aromatic hydrocarbons and ethers may also be used to obtain certain molecular weights of the copolymers. Suitable alkyl alkali metal compounds are, for example, butyl lithium, particularly secondary butyl lithium, Na naphthalene and K naphthalene.

After copolymerization, the polymer formed may be neutralized or reacted with suitable compounds which are capable of reacting with carbanions to form an uncharged stable end product.

Suitable neutralizing agents are, for example, weak inorganic and organic acids or acidic salts of proton acids, N-H- and C-H-acid acids; compounds capable of reacting with carbanions are, for example, alkyl halides (particularly methyl chloride, methyl iodide, benzyl chloride, benzyl bromide), carboxylic acid chlorides (particularly benzoyl chloride, chloroformic acid esters, phosgene, acetyl chloride, caproyl chloride, stearoyl chloride), carboxylic acid anhydrides (particularly acetanhydride, succinic acid anhydride) and carboxylic acid esters (particularly activated esters, such as carboxylic acid phenyl ester, carboxylic acid nitrophenyl ester and also alkyl esters of carboxylic acids), the alkyl groups optionally being substituted by activating groups, such as nitro groups, CN groups, carboxyl groups.

These compounds are normally added to the reaction product, preferably in dissolved form, on completion of copolymerization, their addition being accompanied by thorough mixing. It is of advantage to introduce these compounds in a stoichiometric excess.

The copolymer may be isolated from the reaction product, optionally with removal of unwanted impurities.

To this end, the copolymer may be precipitated from the polymer solution and subsequently purified by washing. The polymer is preferably isolated by evaporation. The polymer may be purified during or before evaporation, for example by azeotropic distillation, extraction or fractional distillation.

Since the process according to the invention involves the use of "living" anions, corresponding conditions, for example the absence of water, have to be maintained. The choice of the reaction conditions for the process according to the invention, particularly the temperature and solvent, is important because the polymerization of the cyclic monomers can be accompanied by unwanted termination reactions which can have an adverse effect on the properties of the copolymers.

The copolymers according to the invention show various properties from crystalline-brittle to amorphous-elastomeric, depending on their monomer composition and the number of polymer blocks in them (i.e. the number of portions "r" of monomer mixture reacted).

The processing of the polymers is governed by their properties. Thus, moldings may be produced, for example, from polymers having thermoplastic properties by known methods for processing thermoplasts.

Surprisingly, the new polymers are still sufficiently stable during processing, even at temperatures above 150° C., and show no molecular degradation. Accordingly, moldings produced therefrom show very good mechanical properties which they retain, even after repeated temperature stressing.

Depending on their chemical synthesis, the copolymers according to the invention may be used with advantage for the production of films, seals, coatings, particularly where improved long-term performance is required. They are also suitable for the production of resin-like, thermoplastic packing materials, particularly for foods.

The polymers according to the invention may be stabilized, pigmented and antistatically finished, made easier to process or flameproofed or filled with fillers in known manner.

EXAMPLES

EXAMPLE 1

Preparation of a copolymer of neopentyl glycol carbonate and ε-caprolactone (50 mole %:50 mole %)

(A=polyneopentyl glycol carbonate block,
B=poly-ε-caprolactone block
X=central link of neopentyl glycol carbonate and ε-caprolactone units)

A solution of 10.2 g neopentyl glycol carbonate and 8.9 g ε-caprolactone in 100 ml toluene was added at −10° C. to a solution of 0.2 ml sec.-butyl lithium (1.4M solution in cyclohexane) in 10 ml toluene. A conversion of 90% was reached after 160 minutes. The reaction mixture was decomposed with 10 ml methanol/hydrochloric acid (ratio by weight 9:1). The reaction product is isolated by precipitation with 250 ml methanol.

EXAMPLE 2

Preparation of a copolymer of neopentyl glycol carbonate and ε-caprolactone (50 mole %:50 mole %)

(for the meanings of A, X and B, see Example 1).

A solution of 5.35 g neopentyl glycol carbonate and 4.7 g ε-caprolactone in 50 ml toluene was added at −10° C. to a solution of 0.2 ml sec.-butyl lithium (1.4M solution in cyclohexane) in 10 ml toluene, followed by stirring for 120 minutes at that temperature. Another solution of 5.35 g neopentyl glycol carbonate and 4.7 g ε-caprolactone in 50 ml toluene was then added and the combined solutions again left to react for 120 minutes at −10° C. The reaction mixture was worked up by decomposition with 10 ml methanol/hydrochloric acid (ratio by weight 9:1) and precipitation with 250 ml methanol.

EXAMPLE 3

Preparation of a copolymer of neopentyl glycol carbonate and ε-caprolactone (50 mole %:50 mole %)

(for the meanings of A, X and B, see Example 1).

A solution of 10.6 g neopentyl glycol carbonate and 9.3 g ε-caprolactone in 100 ml toluene is prepared and cooled to −10° C. One third of the solution is poured into a reaction vessel containing 0.2 ml sec.-butyl lithium (1.4M solution in cyclohexane) in 10 ml toluene, followed by stirring for 70 minutes at −10° C. The second third of the solution is then added and, after another 120 minutes, the last third is added, again being left to react for 120 minutes. The reaction mixture was worked up by decomposition with 10 ml methanol/hydrochloric acid (ratio by weight 9:1) and precipitation with 220 ml methanol.

EXAMPLE 4

Preparation of a copolymer of neopentyl glycol carbonate and ε-caprolactone (60 mole %:40 mole %)

A solution of 15.6 g neopentyl glycol carbonate and 9.1 g 6-caprolactone in 120 ml toluene was added at −10° C. to a solution of 0.4 ml sec.-butyl lithium (1.4M solution in cyclohexane) in 10 ml toluene. A conversion of 86% is reached after 160 minutes. After decomposition with 10 ml methanol/hydrochloric acid (ratio by weight 9:1), the reaction product is isolated by precipitation with 260 ml methanol.

EXAMPLE 5

Preparation of a copolymer of neopentyl glycol carbonate and ε-caprolactone (30 mole %:70 mole %)

$$-\!\!\!+\!\!A\text{-}X\text{-}B\!\!\!+\!\!\!_r$$

A solution of 7.8 g neopentyl glycol carbonate and 15.96 g ε-caprolactone in 95 ml toluene was added at −10° C. to a solution of 0.4 ml sec.-butyl lithium (1.4M solution in cyclohexane) in 10 ml toluene. After 160 minutes, the conversion was >95%. The reaction product was worked up as described in Example 4.

EXAMPLE 6

Preparation of a copolymer of neopentyl glycol carbonate and ε-caprolactone (80 mole %:20 mole %)

$$-\!\!\!+\!\!A\text{-}X\text{-}B\!\!\!+\!\!\!_r$$

A solution of 20.8 g neopentyl glycol carbonate and 4.56 g ε-caprolactone in 80 ml toluene was added at −10° C. to a solution of 0.4 ml sec.-butyl lithium (1.4M solution in cyclohexane) in 10 ml toluene. After 160 minutes, the conversion was >95%. The reaction product was worked up as described in Example 4.

We claim:

1. A sequential polymer corresponding to the idealized formula (I)

$$-[A\text{-}X\text{-}B]_r-\quad (I)$$

with r=1 to 20, in which

-A- is a polymer of a cyclic carbonate corresponding to the general formula (II) and/or (III) below (II) — cyclic carbonate structure with $(CH_2)_n$, $(CH_2)_m$, central C bearing $R^1$, $R^2$ (III) — bicyclic carbonate structure with $(CH_2)_n$, $(CH_2)_m$, $(CH_2)_p$, $(CH_2)_q$, and two C centers each bearing $R^1$, $R^2$ -B- is a polymer of a lactone corresponding to the general formula (IV) below (IV) — lactone structure with $(CH_2)_n$, $(CH_2)_m$, central C bearing $R^1$, $R^2$ X is a central link, containing both the cyclic carbonate of formula (II) and/or (III) and the lactone of formula (IV) in polymerized form, the concentration of the residues of (II) and/or (III) decreasing continuously in the direction of -B- and the concentration of the residues (IV) decreasing continuously in the direction of -A- ("tapered structure"); in formulae (II), (III) and (IV), m, n, p and q independently of one another have the values 0, 1, 2, 3, 4, 5 or 6, with the proviso that the sum of n+m in (II) is at least 1, the sum of n+m in (IV) is at least 1 and the sums of n+p and m+q in (III) are at least 1, and $R^1$ and $R^2$ represent H, $C_1$–$C_6$ alkyl, $C_3$–$C_6$ alkenyl or $C_1$–$C_6$ alk(en)yloxy-$C_1$–$C_6$-alkyl.

2. A sequential polymer as claimed in claim 1 wherein the average molecular weight of the blocks A and B is from 500 to 1,000,000.

3. A sequential polymer as claimed in claim 1 wherein the average molecular weight of the central link X is from 300 to 10,000.

4. A sequential polymer as claimed in claim 1 wherein $R^1$ and $R^2$ each independently represent H, $CH_3$ or $C_2H_5$.

5. A sequential polymer as claimed in claim 1 wherein the content of each of the blocks A and B is from 5 to 95% by weight (based on the total quantity of A+B.)

6. A sequential polymer as claimed in claim 1 wherein the content of central link X with the tapered structure is from 5 to 50% by weight based on (A+B+X).

7. A procees for the production of the polymer as claimed in claim 1, wherein a solution of a mixture of cyclic carbonates corresponding to formulae (II) and/or (III) and lactones corresponding to formula (IV) in an aromatic solvent or an ether is added in portions to a solution of an alkyl alkali metal or aryl alkali metal compound, the combined soltuions are polymerized at 20° C. to −78° C. and the polymer is subsequently isolated.

8. A process as claimed in claim 7, wherein on completion of polymerization, the polymer is neutralized.

9. A process as claimed in claim 7, wherein on completion of polymerization, the anionic polymer formed is reacted with an alkyl halide, carboxylic acid chloride, carboxilic acid anhydride or carboxilic acid ester.

10. A process as claimed in claim 7 wherein the polymerization temperature is 10° C. to −30° C.

11. A process as claimed in claim 7 wherein the polymerization temperature is about −10° C.

12. A process as claimed in claim 7 wherein said aromatic solvent is benzene or toluene.

13. A process as claimed in claim 7 wherein said ether is tetrahydrofuran.

14. A process as claimed in claim 7 wherein the polymerization is carried out in the absence of water.

15. A process as claimed in claim 7 wherein the polymer is isolated by neutralization with an acidic compound or is isolated by reaction with a compound capable of reacting with a carbanion to form an uncharged stable end product.

* * * * *